(12) United States Patent
Barnett et al.

(10) Patent No.: US 7,322,714 B2
(45) Date of Patent: Jan. 29, 2008

(54) DECORATIVE LIGHT AND LANDSCAPE LIGHTING SYSTEM

(75) Inventors: Douglas John Barnett, Waterloo (CA); Attilio Renon, Waterloo (CA)

(73) Assignee: Snapedge Canada Ltd., Ontario (CA)

( * ) Notice: Subject to any disclaimer, the term of this patent is extended or adjusted under 35 U.S.C. 154(b) by 184 days.

(21) Appl. No.: 11/147,617

(22) Filed: Jun. 8, 2005

(65) Prior Publication Data

US 2006/0277823 A1 Dec. 14, 2006

(51) Int. Cl.
*F21V 33/00* (2006.01)
(52) U.S. Cl. ........................ 362/152; 362/246
(58) Field of Classification Search .............. 362/152
See application file for complete search history.

(56) References Cited

U.S. PATENT DOCUMENTS

| | | | | |
|---|---|---|---|---|
| 3,591,144 A | * | 7/1971 | Iving | 404/6 |
| 4,945,675 A | * | 8/1990 | Kendrick | 47/33 |
| 4,986,694 A | * | 1/1991 | Delamere | 404/6 |
| 5,024,406 A | * | 6/1991 | Ketcham | 248/149 |
| 5,410,458 A | * | 4/1995 | Bell | 362/219 |
| 5,442,877 A | * | 8/1995 | Lindhal | 47/33 |
| 5,453,916 A | * | 9/1995 | Tennis et al. | 362/152 |
| 5,535,545 A | * | 7/1996 | Matz | 47/33 |
| 5,542,636 A | | 8/1996 | Mann et al. | |
| 5,609,415 A | | 3/1997 | Protz, Jr. | |
| 6,328,459 B1 | | 12/2001 | Adams | |
| 6,340,238 B1 | | 1/2002 | Pan | |
| 6,389,742 B1 | * | 5/2002 | Wuster | 47/33 |
| 6,409,364 B1 | | 6/2002 | Lin | |
| 7,021,787 B1 | * | 4/2006 | Kuelbs | 362/183 |
| 2003/0202354 A1 | * | 10/2003 | Lin | 362/362 |
| 2004/0197140 A1 | * | 10/2004 | Maleska | 404/6 |

\* cited by examiner

*Primary Examiner*—Hargobind S. Sawhney
(74) *Attorney, Agent, or Firm*—Pyle & Piontek, LLC (57) ABSTRACT

A decorative light and a landscape lighting system incorporating a plurality of decorative lights. The decorative lights are structured for attachment to the top of landscape edging. The lights include a body having a channel formed in its bottom surface for receiving the top edge of landscape edging. The channel may be formed by first and second downwardly projecting walls. The surface of the walls may provide an interior profile or key shape that corresponds to the shape of the top of the landscape edging. An illumination device, such as a light emitting diode, is housed within the decorative light.

22 Claims, 8 Drawing Sheets

DECORATIVE LIGHT AND LANDSCAPE LIGHTING SYSTEM

FIELD OF THE APPLICATION

The present application relates to decorative lighting and, in particular, to a decorative light and a landscape lighting system.

BACKGROUND INFORMATION

There are many existing light strings designed to attach to gutters and trees for decorative purposes. Often, the light strings are intended for seasonal decorations. They are typically intended to be temporarily clipped to eavestroughs and then removed following the seasonal event.

U.S. Pat. No. 5,410,458 to Bell proposes a light string incorporated into landscape edging. In particular, the Bell reference suggests a landscape edging having a tubular top edge of sufficient size to contain a string of miniature Christmas lights. The tubular top edge is substantially transparent, so as to allow for the emission of light. In order to use Bell's system, a user is required to replace existing landscape edging with Bell's edging that features a large tubular top. Edging having a large plastic tubular top visible above the ground may deteriorate from the aesthetic value of the edging.

Accordingly, it would be advantageous to provide a flexible and versatile landscape lighting system.

SUMMARY OF THE APPLICATION

The present application provides decorative light and a landscape lighting system incorporating a plurality of decorative lights. The decorative lights are structured for attachment to the top of landscape edging. The lights include a body having a channel formed in its bottom surface for receiving the top edge of landscape edging. The channel may be defined by two downwardly projecting walls which are parallel and spaced apart from each other. The channel may have an interior profile or key shape that corresponds to the shape of the top of the landscape edging. An illumination device, such as a light emitting diode, is housed within the decorative light.

In one aspect, the present application provides a decorative light for outdoor use in association with landscape edging having a top edge. The decorative light includes a main body having a bottom and an illumination device housed in the main body. The light further includes a first wall projecting downwardly from the bottom and a second wall projecting downwardly from the bottom parallel to and spaced apart from the first wall. The first wall, the second wall, and the bottom define a channel for receiving the top edge of the landscape edging and thereby mounting the decorative light to the landscape edging.

In another aspect, the present application provides a landscape lighting system for outdoor use in association with landscape edging having a top edge. The landscape lighting system connects to a power source. The landscape lighting system includes a length of wiring connected to the power source and a plurality of decorative lights electrically connected to the length of wiring. The decorative lights include a main body having a bottom and an illumination device housed in the main body. The lights further include a first wall projecting downwardly from the bottom and a second wall projecting downwardly from the bottom parallel to and spaced apart from the first wall. The first wall, the second wall, and the bottom define a channel for receiving the top edge of the landscape edging and thereby mounting the decorative light to the landscape edging.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
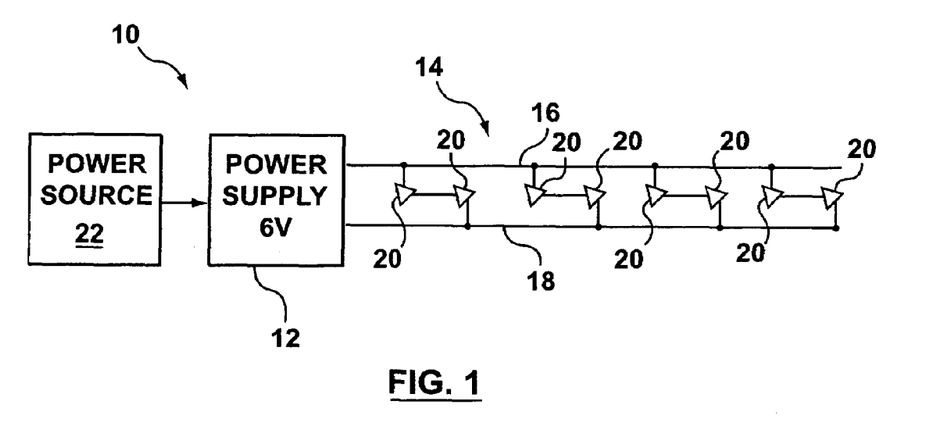
FIG. 1 shows a block diagram of an embodiment of a landscape lighting system.

Reference is first made to FIG. 1, which shows a block diagram of an embodiment of a landscape lighting system 10.

The landscape lighting system 10 includes a low-voltage power supply 12 and a decorative lighting string 14. The decorative lighting string 14 includes a supply wire 16, a return wire 18, and decorative lights 20.

The decorative lights 20 may be connected in parallel, serial, or a combination thereof. In one embodiment, as shown in FIG. 1, the decorative lights 20 are connected in pairs serially with each pair then being connected in parallel with the other pairs. In this embodiment, the decorative lights 20 are electrically coupled to the supply wire 16 and return wire 18 at fixed locations. In another embodiment, the decorative lights 20 may include a clip-type electrical connector (not shown) for detachably connecting the decorative lights 20 to the lighting string 14 at desired locations. The clip-type electrical connector is designed to pierce an insulated jacket to make contact with the interior conductor of the wire. It will be appreciated that this type of connector would be used in an embodiment in which all the decorative lights 20 are connected in parallel.

In an embodiment wherein the decorative lights 20 are connected serially in pairs and in parallel with other pairs, the wiring may include three-conductor jacketed wiring. Such wiring provides a supply conductor, a return conductor and an interconnect conductor for interconnecting pairs of decorative lights 20. In one embodiment, the wiring comprises 3.2 mm wiring. The appropriate gauge of wiring will be understood by those of ordinary skill in the art having regard to particular implementations and the relevant electrical safety standards.

The low-voltage power supply 12 applies a DC voltage across the supply wire 16 and return wire 18 and supplies current to the lighting string 14. In one embodiment, the low-voltage power supply 12 comprises a low-voltage battery. For example, the low-voltage power supply 12 may include a rechargeable 6 volt battery. In another embodiment, the power supply 12 may include conventional 60 Hz 120 V power, stepped-down in voltage and rectified to provide a low voltage DC power source.

In one embodiment, the landscape lighting system further includes a power source 22 for recharging the power supply 12. The power source 22 may, in some embodiments, comprise a battery recharger coupled to the power mains through a conventional household outlet. In another embodiment, the power source 22 may comprise a solar-based recharger for supplying a charging current to the power supply 12.

Figure 2:
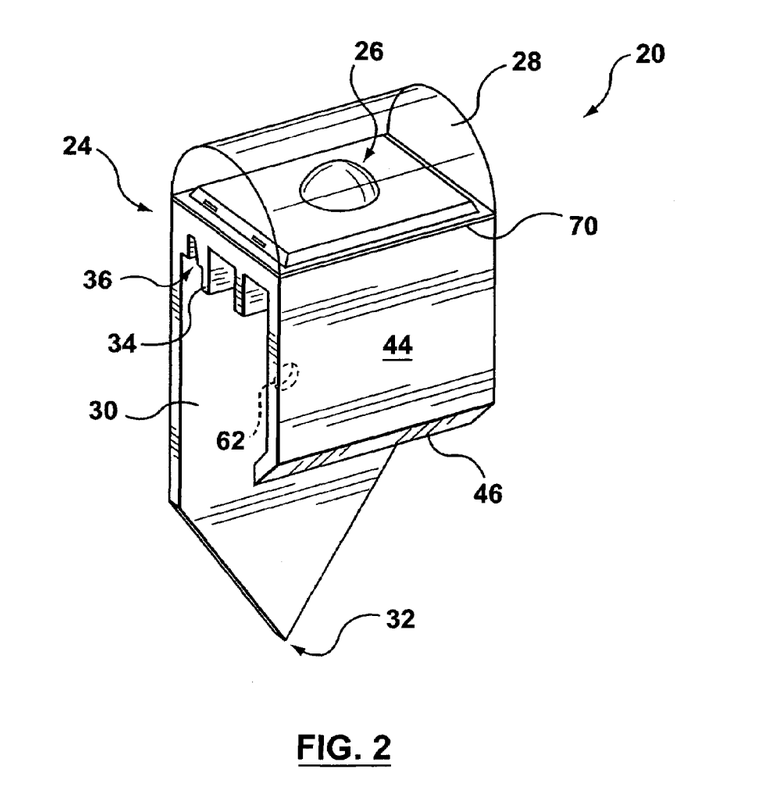
FIG. 2 shows a perspective view of an embodiment of a decorative light.
Figure 3:
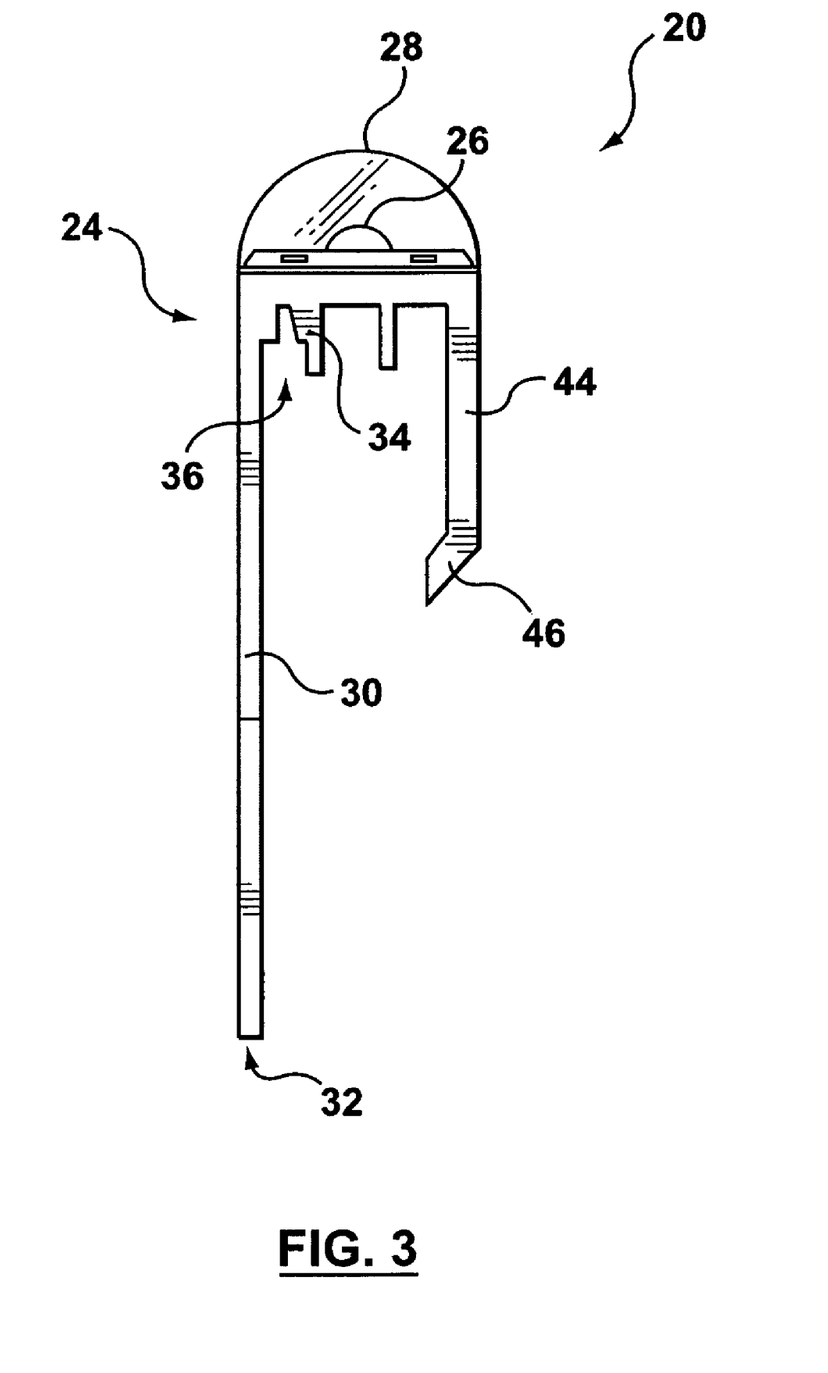
FIG. 3 shows a profile view of the decorative light of FIG. 2.
Figure 4:
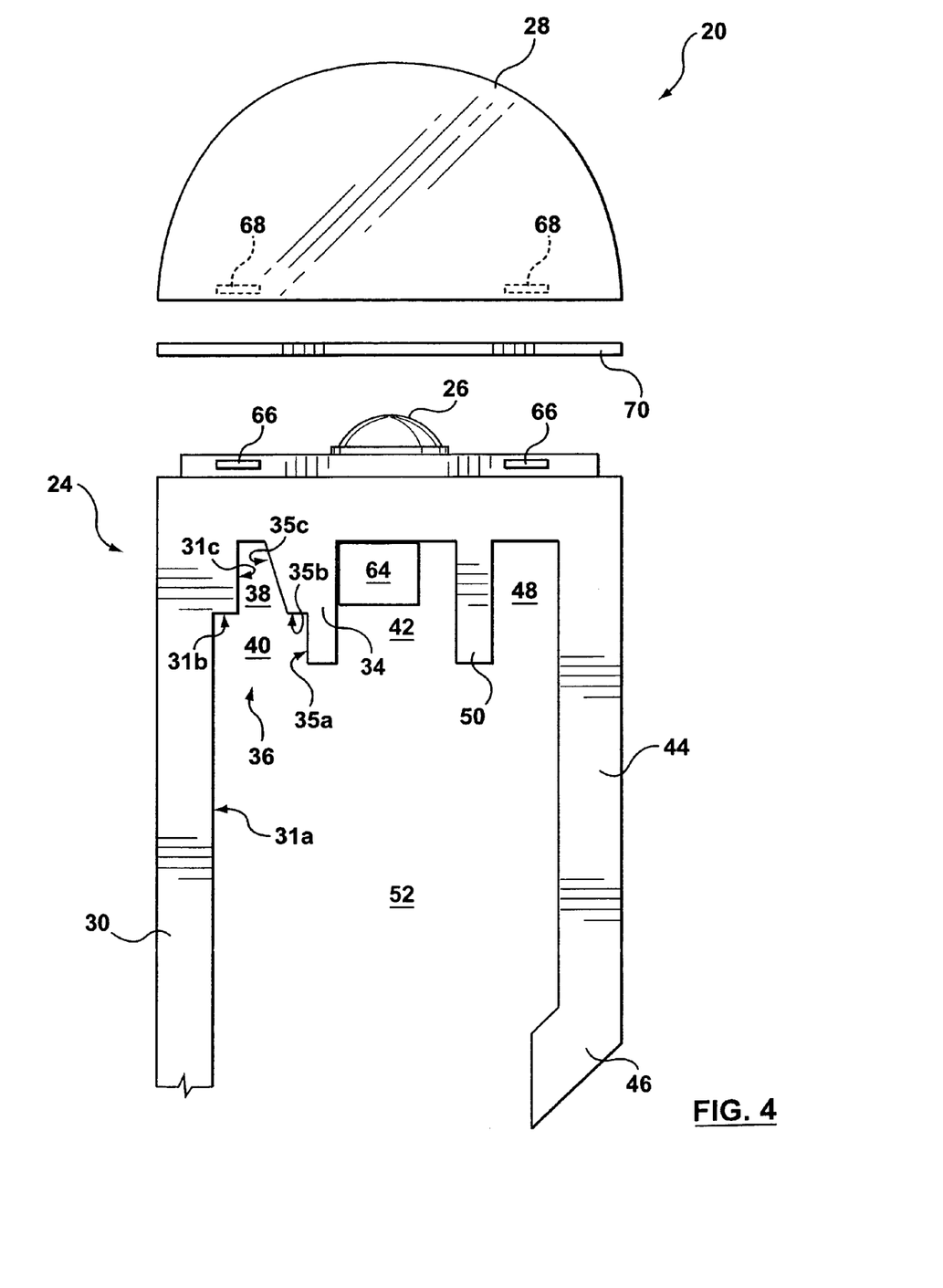
FIG. 4 shows an enlarged portion of the profile view from FIG. 3, with the gasket and cover detached.
Figure 5:
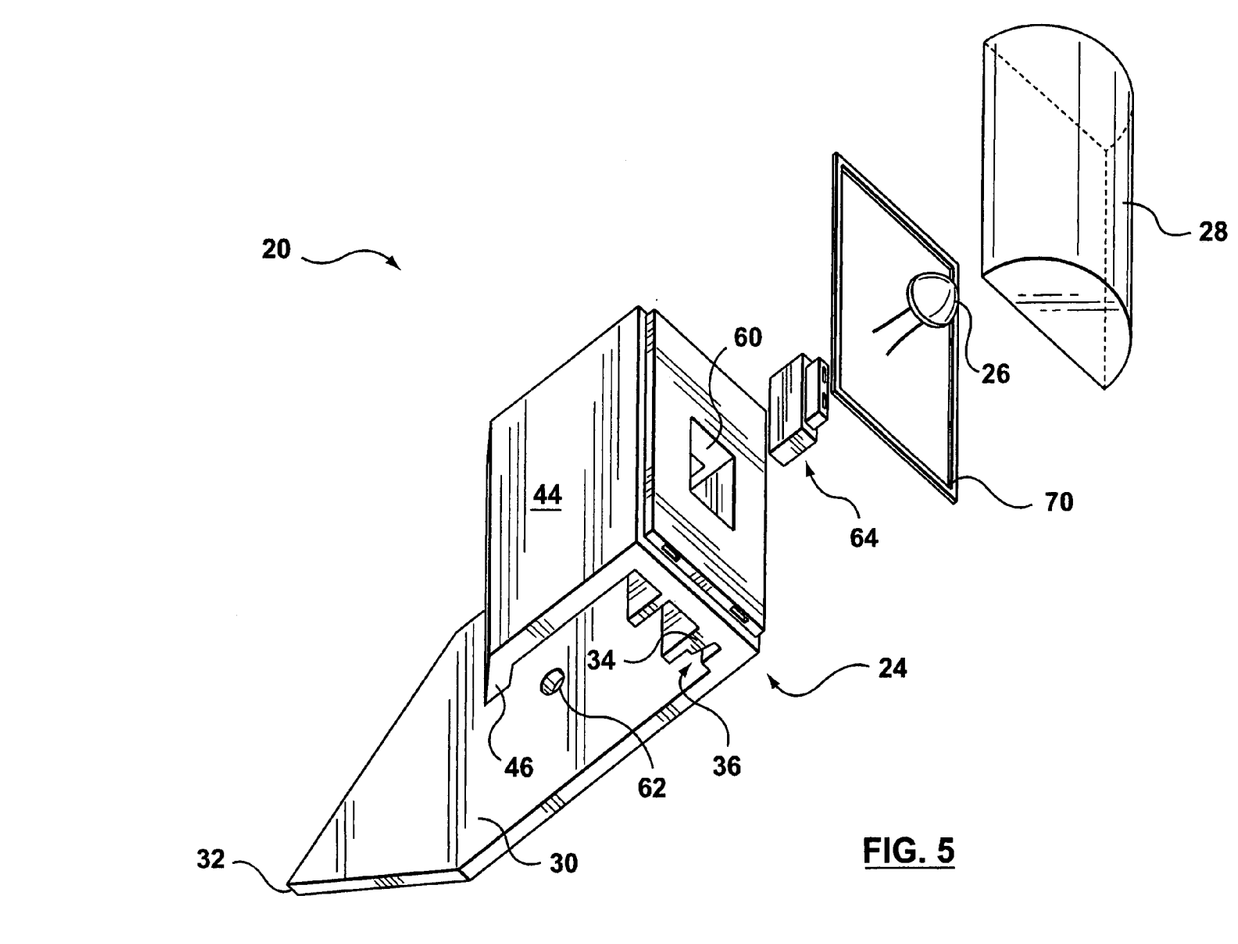
FIG. 5 shows an exploded perspective view of the decorative light of FIG. 2.

Reference is now made to FIGS. 2 through 5. FIG. 2 shows a perspective view of an embodiment of a decorative light 20. FIG. 3 shows a profile view of the decorative light 20 of FIG. 2. FIG. 4 shows an enlarged portion of the profile view from FIG. 3, with a gasket and cover detached. FIG. 5 shows an exploded perspective view of the decorative light 20 of FIG. 2.

The decorative light 20 includes a main body, indicated generally as 24, and an illumination device 26. In one embodiment, the illumination device 26 comprises a light emitting diode (LED) having two electrical leads, as shown in FIG. 5. The illumination device 26 is disposed atop the main body 24 and may be enclosed by a cover 28. The cover 28 in this embodiment is a semi-circular dome. The cover 28 is made of a transparent or translucent material so as to allow the passage of light generated by the illumination device 26. In one embodiment the cover 28 may have a smooth exterior surface and a knurled or partially knurled interior surface. The knurled interior surface may serve to diffuse the light emitted by the LED, providing a more diffuse illumination. In another embodiment the exterior surface may also or alternately be knurled. By way of example, the cover may be manufactured from acrylic ABS.

The cover 28 may be attached to the main body 24 by way of friction fit or snap fit. In one embodiment, the cover includes indentations 68 in its interior surface at either end. The indentations 68 (FIG. 4) may snap fit into engagement with projections 66 (FIG. 4) formed on the top of the main body 24. A gasket 70 is provided between the edge of the cover 28 and the top of the main body 24 so as to provide for a waterproof seal. The gasket 70 may be formed from rubber, silicon, a soft plastic or other suitable material.

As shown in FIG. 5, the top of the main body 24 may define an aperture 60 designed to receive a connector 64 (FIG. 4 or 5). The connector 64 connects the leads of the LED to the wiring in order to connect the LED to the power supply 12 (FIG. 1).

The decorative light 20 is adapted for attachment to the top edge of landscape edging and/or other structures. For this purpose, the decorative light 20 includes a channel having a key shape or interior profile that corresponds to the shape of the top edge of the landscape edging or other structure. The channel may be defined by two downwardly depending parallel walls, whereby the interior surface of the walls and the spacing therebetween defines the key shape of the channel. In some embodiments, the decorative light 20 includes more than one channel, or channels within channels, so as to allow for attachment of the decorative light 20 to a variety of landscape edgings or other structures.

In the embodiment shown in FIGS. 2 through 5, the decorative light 20 includes a first wall 30 and a second wall 44 projecting downwards from the bottom of the main body 24 and defining a channel or interior space 52 (FIG. 4) therebetween. In one embodiment, the second wall 44 may include a distal end formed as an inwardly angled flange 46, which serves to further define the shape of the interior space 52. The second wall 44 and the inwardly angled flange 46 serve to grip a linear structure and hold the decorative light 20 in place. For example, a landscape edging may have a tubular or bulbous top edge, and the interior space 52 may be sized so as to snap-fit or friction-fit to the tubular top edge. The interior space 52 may also allow for attachment of the decorative light 20 to decks, railings, eavestroughs, and other linear structures having a top edge.

The second wall 44 may be constructed of a resiliently flexible material such that the second wall 44 may be temporarily flexed outwards in order to receive structures into the interior space 52. The first wall 30 may be constructed of a similar resiliently flexible material. In many embodiments, the main body 24, first wall 30 and back wall 44 are integrally formed, typically from a suitable plastic material such as polypropylene. The structure may be injection molded using a suitable material, as will be understood by those of ordinary skill in the art.

In one embodiment, the first wall 30 is provided by a flat plate extending downwards from the bottom of the main body 24. In some embodiments, the flat planar first wall 30 is substantially longer than the second wall 44 and it tapers to a pointed end 32 distant from the main body 24. The pointed end 32 allows for relatively easy insertion of the first wall 30 into soil or sod, thereby permitting the decorative light 20 to be deployed without requiring attachment to landscape edging or other structures.

The first wall 30 may also be provided with a central aperture 62. The central aperture 62 allows for the decorative light 20 to be secured to a surface, such landscape edging, trim, fencing, railings, eavestroughs, etc., with a screw, nail, or other suitable fastener.

In addition to, or as an alterative to, the interior space 52 defined by the first wall 30 and second wall 44, one or more channels may be defined in the bottom of the main body 24. In one embodiment, the bottom of the main body 24 includes a dividing wall 34. The dividing wall 34 is parallel to the first wall 30 and spaced apart therefrom. The first wall 30 includes an inner surface 31 (shown in FIG. 4 as 31a, 31b, and 31c). The dividing wall 34 features a channel surface 35 (shown as 35a, 35b, and 35c) facing the inner surface 31 of the first wall 30. The channel surface 35 of the dividing wall 34 and the inner surface 31 of the first wall 30 define a transverse channel 36. The transverse channel 36 may be shaped so as to receiving the top edge of one or more types of landscape edging so as to mount the decorative light 20 to the landscape edging.

In the embodiment shown in FIGS. 2 through 5, the channel surface 35 includes a vertical portion 35a, a shoulder portion 35b, and a tapered portion 35c. The inner surface 31 includes a main portion 31a, a shoulder portion 31b, and an inset portion 31c. Accordingly, the transverse channel 35 includes a tapered inner channel 38 and an outer channel 40. The tapered inner channel 38 is defined by the tapered portion 35c and the inset portion 31c. The outer channel 40 is defined by the vertical portion 35a of the channel surface 35, the main portion 31a of the inner surface 31, and the shoulder portions 31b and 35b.

Together, the outer channel 40 and the inner channel 38 provide a key shape to the transverse channel 36. The key shape is designed to cooperate with the predefined contours of landscape edging systems. For example, the transverse channel 36 may be shaped so as to fit to the top edge of a landscape edging marketed in Canada under the brand Snapedge™ by Snapedge Canada Ltd. as shown in FIG. 6a.

Figure 6A:
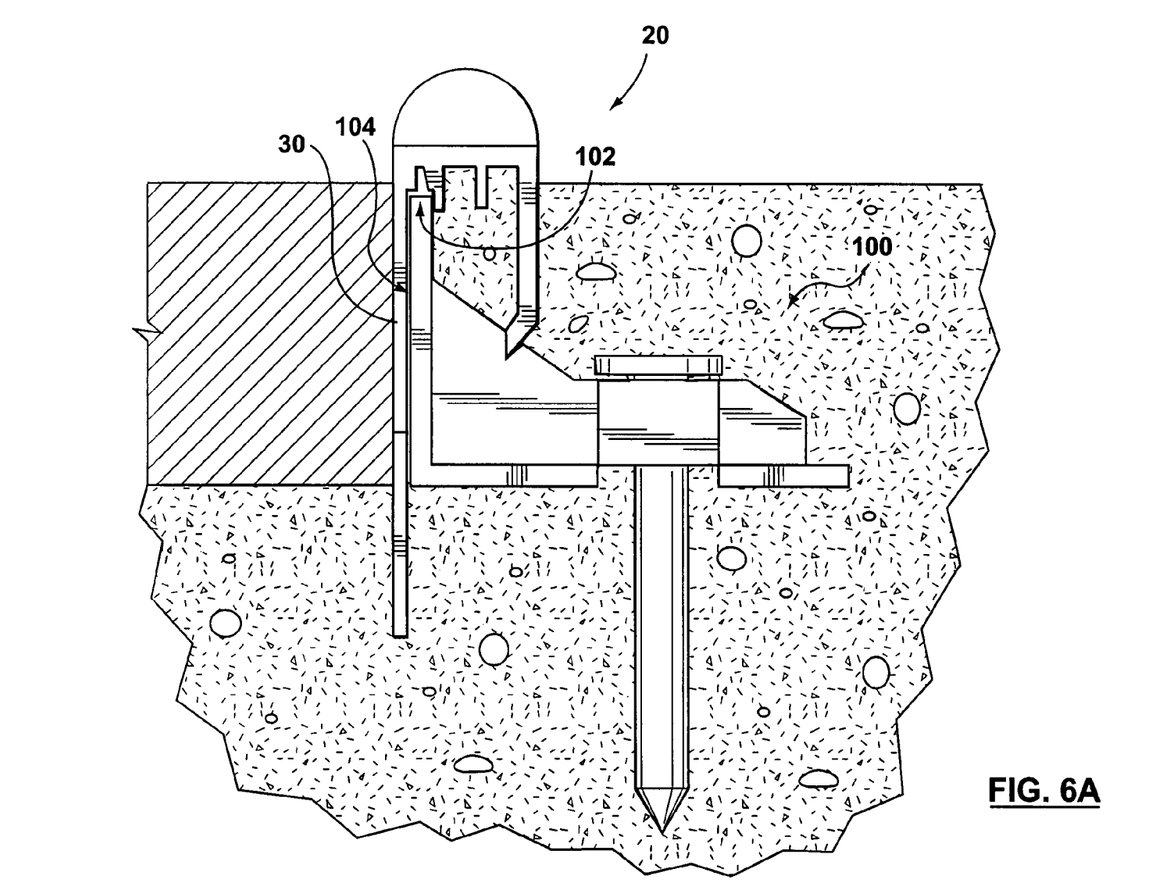
FIGS. 6a through 6f show side views of the decorative light of FIG. 2 attached various types of landscape edging and other structures.
Figure 6B:
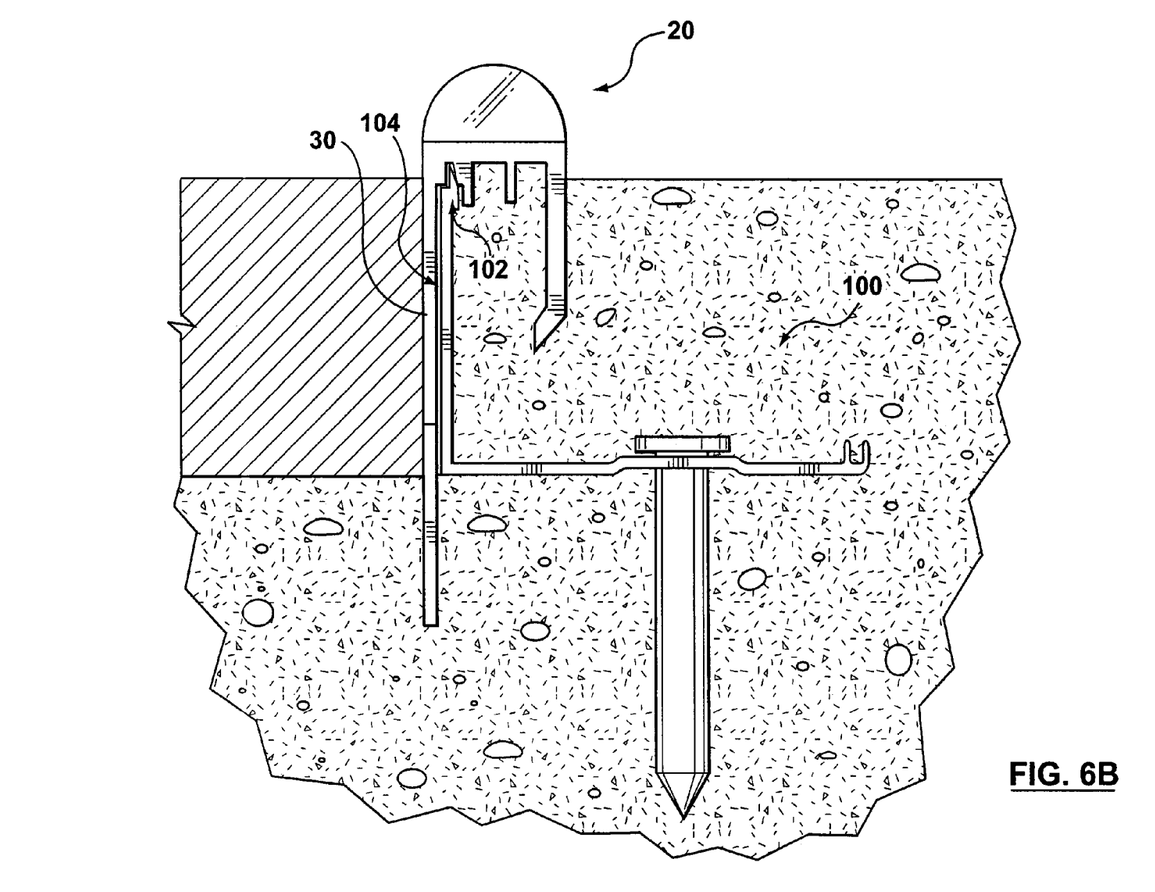

Also by way of example, the outer channel 40 is shaped so as to fit to the top edge of a landscape edging marketed in Canada under the brand name Edge-Scape™ by Snapedge Canada Ltd., as shown in FIG. 6b.

It will be seen from FIGS. 6a and 6b that when the decorative light 20 is mounted to landscape edging 100, the transverse channel 36 engages the top edge 102 of the landscape edging 100 and the inner surface 31 of the first wall 30 is positioned against the outer vertical surface 104 of the landscape edging 100. In particular, the first wall 30 may be inserted into the soil, grass, sand, or other soft material abutting the outer vertical surface 104 of the landscape edging 100. The pointed end 32 of the first wall 30 allows for relatively easy insertion and attachment of the decorative light 20 to the landscape edging 100. In some embodiments the first wall 30 may be inserted between the outer vertical surface 104 of the landscape edging 100 and hard-scaping material, such as patio bricks, and/or aggregates like gravel or sand.

Figure 6C:
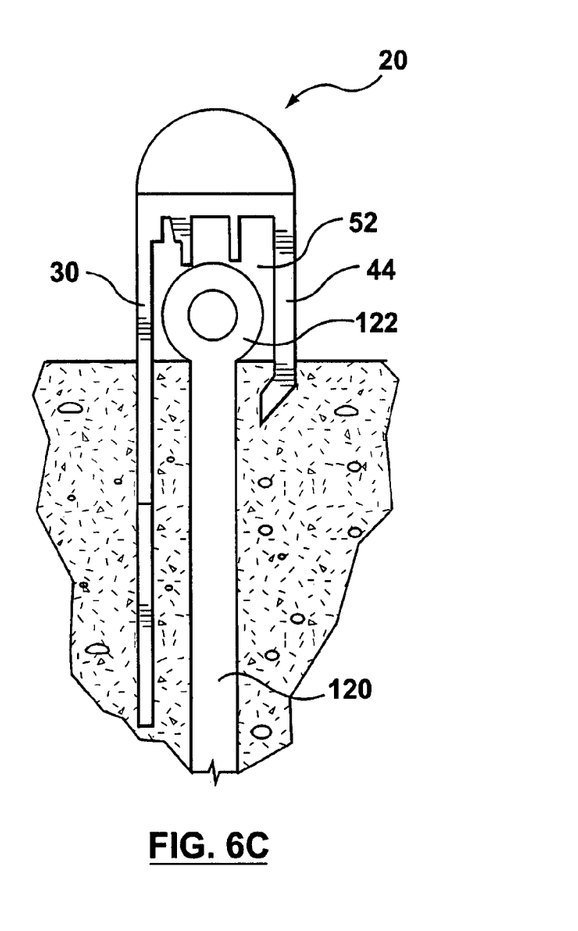
Figure 6D:
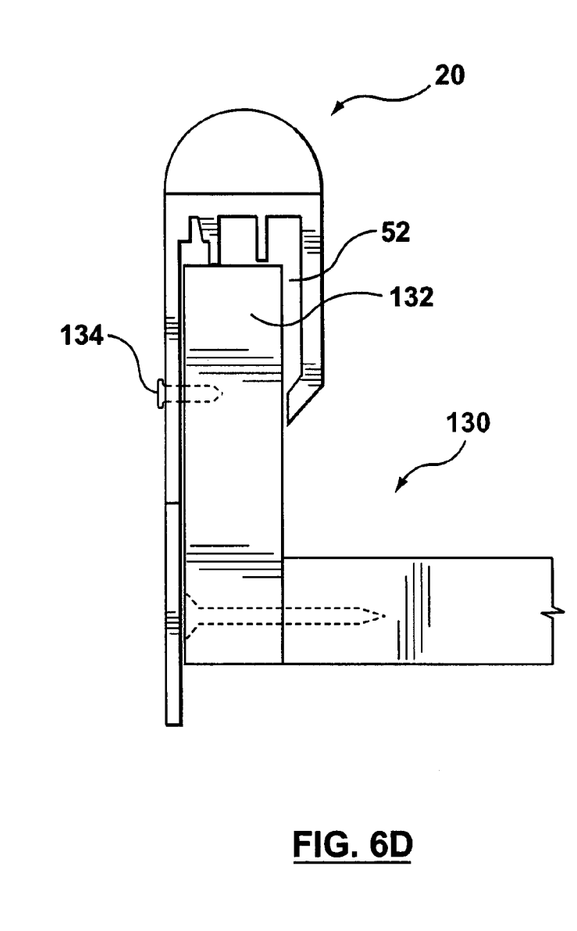
Figure 6E:
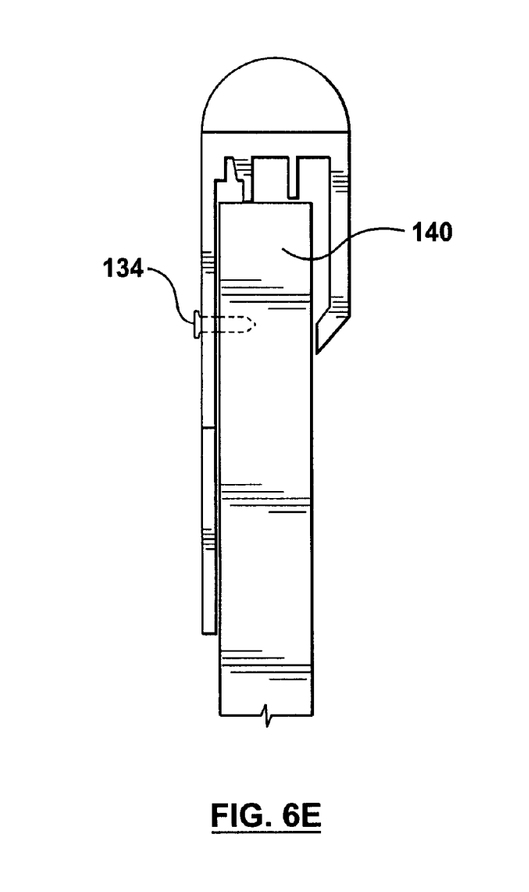
Figure 6F:
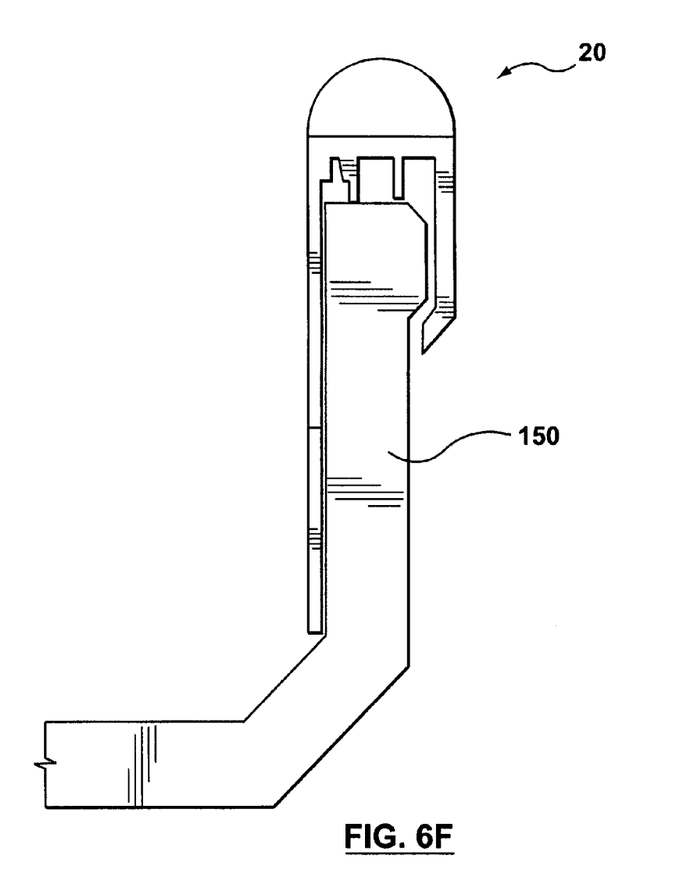

Reference is also made to FIGS. 6c, 6d, 6e, and 6f, which show an embodiment of the decorative light 20 mounted to other structures. For example, FIG. 6c shows the decorative light 20 mounted to a common type of landscape edging 120. The landscape edging 120 includes a tubular top edge 122 that fits within the interior space 52 defined by the first wall 30 and the second wall 44. FIG. 6d shows the decorative light 20 mounted to a deck or dock structure 130. The deck or dock structure 130 includes a projecting edge 132 that fits within the interior space 52 of the decorative light 20. A set screw 134 or other fastener may hold the decorative light 20 in place on the deck or dock structure 130. Similarly, FIG. 6e shows the decorative light 20 mounted to perimeter fencing 140. FIG. 6f shows the decorative light 20 mounted to an eavestrough 150.

Referring again to FIGS. 2 through 5, the main body 24 may further define a wiring channel 42 FIG. 4). The wiring channel 42 is defined, in part, by the dividing wall 34. The other side of the wiring channel 42 may, in some embodiments, be defined by the second wall 44. In some other embodiments, and as shown in FIGS. 2 through 5, the other side of the wiring channel 42 is defined by a second dividing wall 50 (FIG. 4). The second dividing wall 50 thereby also defines a third channel 48 adjacent the second wall 44.

The wiring channel 42 is provided to receive the wires connecting the decorative light 20 to other decorative lights 20 and the power supply 12 (FIG. 1). The wiring channel 42 is adapted to allow the wires to run through the decorative light 20 and to provide space for the connector 64 to connect the wires to leads on the illumination device 26. Once connected, the wires and connector are sealed in place within the wiring channel 42 with a protective waterproof sealant, such silicon.

The third channel 48 may be sized so as to allow for attachment of the decorative light 20 to other linear structures having a top edge sized to engage the third channel 48.

Those of ordinary skill in the art will appreciate that the channel(s) described in connection with the above embodiment(s) are shaped to as to cooperatively engage the top edge of one or more types of landscape edging or other structures. It will be understood that in other embodiments, the key shape of the channels may be adapted to other types of landscape edging so as to cooperative engage the profiles of those other types of landscape edging or other structures.

It will be appreciated by those of ordinary skill in the art that embodiments of the decorative light 20 may include a channel, such as the interior space 52, defined by the first wall 30 and the second wall 44. Other embodiments, may includes a channel, such as the transverse channel 36, defined by the dividing wall 34 and the first wall 30, without the second wall 44. Other embodiments may include both channels and/or additional channels.

The present application may be embodied in other specific forms without departing from the spirit or essential characteristics thereof. Certain adaptations and modifications of the application will be obvious to those skilled in the art. Therefore, the above discussed embodiments are considered to be illustrative and not restrictive, the scope of the application being indicated by the appended claims rather than the foregoing description, and all changes which come within the meaning and range of equivalency of the claims are therefore intended to be embraced therein.

What is claimed is:

1. A decorative light for outdoor use in association with landscape edging having a top edge, the decorative light comprising:
a main body having a bottom;
an illumination device housed in said main body;
a first wall projecting downwardly from said bottom; and
a second wall projecting downwardly from said bottom parallel to and spaced apart from said first wall,
wherein said first wall, said second wall, and said bottom define a transverse channel for receiving the top edge of the landscape edging and thereby mounting the decorative light to the landscape edging, wherein said second wall comprises a downwardly depending front plate parallel to said second wall and spaced apart therefrom, said front plate including an inwardly angled distal end; wherein an interior cross-section of said transverse channel being of key-shape, said interior cross-sectional key shape corresponding to the profile of the top edge of the landscape edging.

2. The decorative light claimed in claim 1, wherein said first wall comprises a downwardly depending flat plate.

3. The decorative light claimed in claim 2, wherein said flat plate includes a pointed end.

4. The decorative light claimed in claim 1, wherein said second wall includes a second shoulder portion and a tapered wall, wherein said first wall includes a first shoulder portion, and wherein said second shoulder portion, said tapered wall and said first shoulder portion partially define a key shape of said transverse channel.

5. The decorative light claimed in claim 1, wherein said transverse channel includes a first channel and a second channel, said second channel being formed at the base of said first channel and said first channel having a first width for receiving a first type of landscape edging, and a second channel having a second width for receiving a second type of landscape edging, said first width being wider than said second width.

6. The decorative light claimed in claim 5, wherein said front plate comprises a resiliently flexible material.

7. The decorative light claimed in claim 1, further including a cover disposed on a top of said main body, said cover including translucent material for allowing emission of light from said illumination device.

8. The decorative light claimed in claim 7, wherein said cover includes a knurled surface for diffusing light.

9. The decorative light claimed in claim 1, wherein said illumination device comprises a light emitting diode.

10. The decorative light claimed in claim 1, further including a wiring connector for connecting said illumination device to wiring, and wherein said main body defines a central aperture for housing said wiring connector.

11. The decorative light claimed in claim 10, further including a wiring channel defined within the bottom of said main body for routing said wiring for connection to said wiring connector.

12. A landscape lighting system for outdoor use in association with landscape edging, the landscape edging having a top edge, the landscape lighting system having connection to a power source, said landscape lighting system comprising:
 a length of wiring connected to the power source; and
 a plurality of decorative lights electrically connected to said length of wiring, said decorative lights including:
  a main body having a bottom;
  an illumination device housed in said main body;
  a first wall projecting downwardly from said bottom; and
  a second wall projecting downwardly from said bottom parallel to and spaced apart from said first wall,
  wherein said first wall, said second wall, and said bottom define a transverse channel for receiving the top edge of the landscape edging and thereby mounting the decorative light to the landscape edging, wherein said second wall comprises a downwardly depending front plate parallel to said second wall and spaced apart therefrom, said front plate including an inwardly angled distal end wherein an interior cross-section of said transverse channel being of key-shape, said interior cross-sectional key shape corresponding to the profile of the top edge of the landscape edging.

13. The landscape lighting system claimed in claim 12, wherein said first wall comprises a downwardly depending flat plate having a pointed end.

14. The landscape lighting system claimed in claim 12, wherein said second wall includes a second shoulder portion and a tapered wall, wherein said first wall includes a first shoulder portion, and wherein said second shoulder portion, said tapered wall and said first shoulder portion partially define a key shape of said transverse channel.

15. The landscape lighting system claimed in claim 12, wherein said transverse channel includes a first channel and a second channel, said second channel being formed at the base of said first channel and said first channel having a first width for receiving a first type of landscape edging, and a second channel having a second width for receiving a second type of landscape edging, said first width being wider than said second width.

16. The landscape lighting system claimed in claim 15, wherein said front plate comprises a resiliently flexible material.

17. The landscape lighting system claimed in claim 12, further including a cover disposed on a top of said main body, said cover including translucent material for allowing emission of light from said illumination device.

18. The landscape lighting system claimed in claim 17, wherein said cover includes a knurled surface for diffusing light.

19. The landscape lighting system claimed in claim 12, wherein said illumination device comprises a light emitting diode.

20. The landscape lighting system claimed in claim 12, further including a wiring connector for connecting said illumination device to wiring, and wherein said main body defines a central aperture for housing said wiring connector.

21. The landscape lighting system claimed in claim 20, further including a wiring channel defined within the bottom of said main body for routing said wiring for connection to said wiring connector.

22. The landscape lighting system claimed in claim 12, further including a solar-based rechargeable power supply connected to said wiring for supplying power to said decorative lights.

* * * * *